(12) United States Patent
Kato et al.

(10) Patent No.: US 6,716,399 B2
(45) Date of Patent: Apr. 6, 2004

(54) APPARATUS FOR DECOMPOSING HALOGENATED ALIPHATIC HYDROCARBON COMPOUNDS OR AROMATIC COMPOUNDS

(75) Inventors: Kinya Kato, Atsugi (JP); Etsuko Sugawa, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/454,670

(22) Filed: Jun. 5, 2003

(65) Prior Publication Data

US 2003/0196886 A1 Oct. 23, 2003

Related U.S. Application Data

(62) Division of application No. 09/451,443, filed on Nov. 30, 1999, now Pat. No. 6,610,178.

(30) Foreign Application Priority Data

Nov. 30, 1998 (JP) ............................................ 10-340316

(51) Int. Cl.$^7$ .............................. B01J 19/12; C02F 1/48
(52) U.S. Cl. .................... 422/186.3; 210/748; 210/754; 210/198.1
(58) Field of Search ...................... 422/186.3; 210/742, 210/750, 754, 748, 198.1; 204/157.15, 158.2, 158.21; 205/746

(56) References Cited

U.S. PATENT DOCUMENTS

| 3,649,493 A | 3/1972 | Meiners et al. ............ 204/157.5 |
| 4,009,099 A | 2/1977 | Jeris ............................... 210/3 |
| 5,053,142 A | 10/1991 | Sorensen et al. ............ 210/742 |
| 5,292,409 A | 3/1994 | Dixon et al. ............. 204/290.3 |
| 5,308,507 A | 5/1994 | Robson ........................ 210/748 |
| 5,393,394 A | 2/1995 | Ikeda et al. ............... 204/158.2 |
| 5,494,574 A | 2/1996 | Unterman et al. ........... 210/150 |
| 5,582,741 A | 12/1996 | Kenmoku et al. ........... 210/748 |
| 5,611,642 A | 3/1997 | Wilson ........................ 405/128 |
| 5,679,568 A | 10/1997 | Imamura et al. .......... 435/262.5 |
| 5,832,361 A | 11/1998 | Foret ........................... 422/186 |
| 5,997,717 A | 12/1999 | Miyashita et al. ........... 205/466 |
| 6,497,795 B1 | 12/2002 | Kato ........................ 204/157.3 |
| 2002/0130030 A1 | 9/2002 | Kato et al. .............. 204/157.15 |

FOREIGN PATENT DOCUMENTS

| DE | 43 30 518 A1 | 3/1995 |
| DE | 44 00 308 A1 | 7/1995 |
| DE | 44 37 812 A1 | 4/1996 |
| EP | 0 252 688 | 7/1987 |
| EP | 0 968 739 A1 | 1/2000 |
| JP | 49-45027 | 12/1974 |

(List continued on next page.)

OTHER PUBLICATIONS

Ute Heinze & Hans–Jürgen Rehm, "Biodegradation of Dichloroacetic Acid by Entrapped and Adsorptive Immobilized *Xanthobacter Autrophicus* GJ10," 40 *Appl. Microbiol. Biotechnol.* 158–64 (1993).

Patent Abstract of Japan, vol. 018, No. 043, (C–1156) Jan. 24, 1994; publication No. JP 05269374.

Nakanishi, "Present Status of Groundwater/Soil Contamination and Their Management" *Research Institute of Environmental Technology*, 1995 (pp. 220–227) and translation.

*Primary Examiner*—James J. Seidleck
*Assistant Examiner*—Thao Tran
(74) *Attorney, Agent, or Firm*—Fitzpatrick, Cella, Harper & Scinto

(57) ABSTRACT

An apparatus for decomposing a target substance, which is a halogenated aliphatic hydrocarbon compound or a halogenated aromatic compound. This apparatus has a water tank for holding water containing chlorine and for contacting the target substance with the chlorine, a means for feeding the target substance to the water, a light source for irradiating the water containing the supplied target substance with light at a wavelength of 300 nm to 500 nm, and a means for reducing a chlorine concentration of a wastewater discharged from the water tank by contacting the wastewater with air.

9 Claims, 7 Drawing Sheets

FOREIGN PATENT DOCUMENTS

| | | |
|---|---|---|
| JP | 52-47459 | 12/1977 |
| JP | 60-261590 | 12/1985 |
| JP | 62-191095 | 8/1987 |
| JP | 1-180293 | 7/1989 |
| JP | 3-38297 | 2/1991 |
| JP | 3-074507 | 3/1991 |
| JP | 5-115722 | 5/1993 |
| JP | 5-149127 | 6/1993 |
| JP | 6-246133 | 9/1994 |
| JP | 7-000819 | 1/1995 |
| JP | 7-51675 | 2/1995 |
| JP | 7-144137 | 6/1995 |
| JP | 8-000759 | 1/1996 |
| JP | 8-140665 | 6/1996 |
| JP | 8-141367 | 6/1996 |
| JP | 8-229385 | 9/1996 |
| JP | 8-243351 | 9/1996 |
| WO | WO 94/03399 | 2/1994 |

US 6,716,399 B2

APPARATUS FOR DECOMPOSING HALOGENATED ALIPHATIC HYDROCARBON COMPOUNDS OR AROMATIC COMPOUNDS

This application is a division of application Ser. No. 09/451,443, filed on Nov. 30, 1999 now U.S. Pat. No. 6,610,178, which is incorporated herein by reference.

BACKGROUND OF THE INVENTION

1. Field of the Invention

The present invention relates to a method for decomposing halogenated aliphatic hydrocarbon compounds or aromatic compounds, a method for cleaning a medium contaminated with at least one of these compounds, and an apparatus to be used for the same.

2. Related Background Art

As the industry develops, a variety of halogenated aliphatic hydrocarbon compounds and aromatic compounds have been used in large amounts, posing severe disposal problems. A variety of halogenated aliphatic hydrocarbon waste has been causing environmental problems, e.g., environmental pollution, and a great deal of effort has been expended to solve these problems.

For example, a combustion process has been proposed to decompose chlorinated aliphatic hydrocarbon compounds, where the compounds are first adsorbed to activated charcoal or the like and then burned.

Also techniques of using an oxidizing agent or a catalyst for decomposing chlorinated aliphatic hydrocarbon compounds have been proposed. Specific examples include a process of decomposing harmful hydrocarbons using ozone (Japanese Patent Application Laid-Open No. 3-38-297), a process of wet oxidation decomposition at a high temperature under a high pressure and a process of oxidation decomposition with hydrogen peroxide or a salt of iron (Japanese Patent Application Laid-Open No. 60-261590).

There is also proposed a process wherein sodium hypochlorite is used as an oxidizing agent (U.S. Pat. No. 5,611,642), or a combination use of sodium hypochlorite and UV irradiation (U.S. Pat. No. 5,582,741). In addition, a process has been proposed where a suspension of a photocatalyst (fine particles of an oxide semiconductor such as titanium oxide) in liquid chlorinated aliphatic hydrocarbons is prepared under alkaline conditions and decomposed upon irradiation with light (Japanese Patent Application Laid-Open No. 7-144137).

Also, a photolysis process of decomposing chlorinated aliphatic hydrocarbon compounds by irradiating with UV light in a gaseous phase without an oxidizing agent is proposed (H. Seki et al, "Contaminated Groundwater and Soil: Present Condition and Countermeasure", ed. by Kansai Branch of Japan Water Environment Society and Environmental Technology Research Institute, 1995; Japanese Patent Application Laid-Open No. 8-243351).

It is known that chlorinated aliphatic hydrocarbons, such as trichloroethylene (TCE) and polychloroethylene (PCE), are decomposed by microorganisms aerobically or anaerobically, and there were attempts to decompose such compounds and purify the environment by such a microbial process.

Japanese Patent Application Laid-Open No. 8-141367 discloses a process of decomposing CFCs by mixing them with fuel, such as alcohol or ether, and burning them in the presence of a catalyst.

U.S. Pat. No. 5,393,394 discloses a process of decomposing CFCs by exposing them to ultraviolet light either directly or after dissolving them into a solvent.

Japanese Patent Application Laid-Open No. 3-074507 discloses a method for reductively decomposing gaseous chlorofluorohydrocarbon by contacting it with an electrode in an electrolytic vessel.

As proposed techniques for decomposing the other organic compounds, e.g., hardly decomposable aromatic compounds such as those having a biphenyl bond and/or a biphenyl skeleton, there are (1) combustion, (2) decomposition by UV or ionizing radiation exposure and (3) decomposition using microorganisms. In Japan, only method (1) is in practice.

As a method for decomposing biphenyl compounds, there is a process wherein such compounds are decomposed by irradiation with UV light directly or after dissolving these compounds are dissolved. For example, Japanese Patent Publication No. 52-47459 discloses a method of rendering polychlorinated biphenyl harmless by dissolving it in alkaline alcohol, removing oxygen from the solution and then exposing the solution to ionizing radiation or UV light.

Other known techniques for rendering PCB harmless include those described in Japanese Patent Application Laid-Open No. 62-191095 and Japanese Patent Publication Nos. 49-45027 and 57-166175.

Japanese Patent Application Laid-Open No. 7-000819 discloses a method for removing polychlorinated biphenyl etc. by utilizing the photocatalytic activity of titanium oxide.

Japanese Patent Application Laid-Open No. 8-000759 describes a photodecomposition apparatus and method for degrading polychlorinated biphenyl.

Methods for degrading biphenyl compounds by utilizing microorganisms have been disclosed by, for example, Japanese Patent Application Laid-Open No. 8-229385.

SUMMARY OF THE INVENTION

The inventors of the present invention have studied the above-mentioned methods for decomposing halogenated aliphatic hydrocarbon and aromatic compounds and found that theses methods have, or involve, problems, concluding that there is still a strong need for eco-friendly technology for decomposing halogenated aliphatic hydrocarbon compounds or aromatic compounds. In a study for achieving the above objects, the inventors found that functional water, e.g., acidic functional water, which is obtained through electrolysis of water and which sterilizing (Japanese Patent Application Laid-Open No. 1-180293) and cleansing effect on the surface of semiconductor wafers (Japanese Patent Application Laid-Open No. 7-51675) have been reported, can remarkably accelerate the decomposition of halogenated aliphatic hydrocarbon compounds or aromatic compounds under light irradiation.

The present invention is based on this finding.

An object of the present invention is to provide a method of efficiently decomposing halogenated aliphatic hydrocarbon compounds or aromatic compounds in a more eco-friendly manner with less possibility of producing decomposition products that will contaminate the environment, as well as an apparatus to be used for such a method.

Another object of the present invention is to provide a method for efficiently purifying an exhaust containing halogenated aliphatic hydrocarbon compounds or aromatic compounds and an apparatus to be used for such a method.

According to an aspect of the present invention, there is provided a method for decomposing halogenated aliphatic hydrocarbon compounds or aromatic compounds, which comprises the steps of:
  (i) contacting a halogenated aliphatic hydrocarbon compound or aromatic compound with functional water under irradiation with light, the functional water being produced by electrolysis of an aqueous electrolyte solution; and
  (ii) neutralizing wastewater from the step (i).

According to another aspect of the present invention, there is provided a method for decomposing halogenated aliphatic hydrocarbon compounds or aromatic compounds, which comprises the steps of:
  (i) bringing the halogenated aliphatic hydrocarbon compound or aromatic compound into contact with functional water containing hypochlorous acid under irradiation with light; and
  (ii) neutralizing wastewater from the step (i).

According to still another embodiment of the present invention, there is provided a method for decomposing halogenated aliphatic hydrocarbons or aromatic compounds, which comprises the steps of:
  (i) bringing a halogenated aliphatic hydrocarbon compound or aromatic compound into contact with functional water under irradiation with light, the functional water being produced by electrolysis of an aqueous electrolyte solution; and
  (ii) bringing wastewater from the step (i) into contact with a microorganism which can decompose a compound contained in wastewater from the step (i).

According to still another aspect of the present invention, there is provided a method for decomposing halogenated aliphatic hydrocarbon compounds or aromatic compounds, which comprises the steps of:
  (i) bringing a halogenated aliphatic hydrocarbon compound or aromatic compound into contact with functional water under irradiation with light, the functional water being produced by electrolysis of an aqueous electrolyte solution; and
  (ii) bringing wastewater from the step (i) into contact with a microorganism which can decompose a compound contained in the wastewater from the step (i).

According to still another aspect of the present invention, there is provided a method for purifying a medium polluted with at least one of halogenated aliphatic hydrocarbon compounds and aromatic compounds, which comprises the steps of:
  (i) contacting the contaminated medium with functional water under irradiation with light, the functional water being produced by electrolysis of an aqueous electrolyte solution; and
  (ii) neutralizing wastewater from the step (i).

According to still another aspect of the present invention, there is provided a method for purifying a medium polluted with at least one of halogenated aliphatic hydrocarbon compounds and aromatic compounds which comprises the steps of:
  (i) contacting the contaminated medium with functional water containing hypochloric acid under irradiation with light; and
  (ii) neutralizing wastewater from the step (i).

According to still another aspect of the invention, there is provided an apparatus for decomposing at least one of halogenated aliphatic hydrocarbon compounds and aromatic compounds, which comprises:
  (1) an electrolysis tank having an anodic and cathodic compartments partitioned with a diaphragm, a pair of electrodes provided in the compartments respectively, and a power source to apply a potential to the electrodes,
  (2) means for supplying an aqueous electrolytic solution to the electrolysis tank,
  (3) means for irradiating light at least to the anodic compartment of the electrolysis tank,
  (4) means for supplying the halogenated aliphatic hydrocarbon compound or the aromatic compound to be decomposed to the anodic compartment in the electrolysis tank, and
  (5) means for mixing wastewater discharged from the anodic compartment of the electrolysis tank with a liquid flowing out from the cathodic compartment of the electrolysis tank.

According to still another aspect of the invention, there is provided an apparatus for decomposing halogenated aliphatic hydrocarbon compounds or aromatic compounds, which comprises
  (1) a decomposition treatment tank,
  (2) means for supplying functional water to the decomposition treatment tank, the functional water being produced around an anode when an aqueous electrolytic solution is electrolyzed in an electrolytic tank having two compartments partitioned by a diaphragm and provided with an anode and a cathode respectively,
  (3) means for supplying the halogenated aliphatic hydrocarbon compound or the aromatic compound to be decomposed to the decomposition treatment tank,
  (4) means for irradiating light to the decomposition treatment tank, and
  (5) means for mixing wastewater discharged from the decomposition treatment tank with alkaline water produced around the cathode by the electrolysis of the aqueous electrolytic solution.

According to still another aspect of the invention, there is provided an apparatus for decomposing halogenated aliphatic hydrocarbon compounds or aromatic compounds, which comprises
  (1) a decomposition treatment tank for holding functional water containing hypochlorous acid,
  (2) means for supplying the halogenated aliphatic hydrocarbon compound or the aromatic compound to be decomposed to the decomposition treatment tank,
  (3) means for irradiating light to the decomposition treatment tank, and
  (4) means for mixing wastewater discharged from the decomposition treatment tank with an alkaline aqueous solution.

According to still another aspect of the invention, there is provided an apparatus for decomposing halogenated aliphatic hydrocarbon compounds or aromatic compounds, which comprises
  (1) an electrolysis tank having an anodic and cathodic compartments partitioned with a diaphragm, a pair of electrodes each provided in each component, and a power source to apply a potential to the electrodes,
  (2) means for supplying an aqueous electrolytic solution to the electrolysis tank,
  (3) means for irradiating light at least to the anodic compartment of the electrolysis tank,
  (4) means for supplying the halogenated aliphatic hydrocarbon compound or the aromatic compound to be decomposed to the anodic compartment in the electrolysis tank, and (5) means for mixing wastewater discharged from the anodic compartment of the electrolysis tank with a microorganism which can degrade a halogenated acid.

According to still another aspect of the invention, there is provided an apparatus for decomposing halogenated aliphatic hydrocarbon compounds or aromatic compounds, which comprises (1) a decomposition treatment tank, (2) means for supplying functional water to the decomposition treatment tank, where the functional water is produced around an anode when an aqueous electrolytic solution is electrolyzed in an electrolytic tank having an anodic and cathodic compartments partitioned by a diaphragm and provided with an anode and a cathode respectively, (3) means for supplying the halogenated aliphatic hydrocarbon compound or the aromatic compound to be decomposed to the decomposition treatment tank, (4) means for irradiating light to the decomposition treatment tank, and (5) means for mixing wastewater discharged from the decomposition treatment tank with a microorganism which can degrade a halogenated acid.

According to still further aspect of the invention, there is provided an apparatus for decomposing halogenated aliphatic hydrocarbon compounds or aromatic compounds, which comprises (1) a decomposition treatment tank for holding the functional water containing hypochlorous acid, (2) means for supplying the-halogenated aliphatic hydrocarbon compound or the aromatic compound to be decomposed to the decomposition treatment tank, (3) means for irradiating light to the decomposition treatment tank, and (4) means for mixing wastewater discharged from the decomposition treatment tank with a microorganism, which can degrade a halogenated acid.

According to the above-mentioned embodiments of the present invention, halogenated aliphatic hydrocarbon compounds or aromatic compounds can be decomposed with a lessened burden on the environment.

Further, according to the embodiments of the present invention, a medium contaminated with halogenated aliphatic hydrocarbon compounds and/or aromatic compounds can be purified with a lessened burden on the environment.

Still, according to the embodiments of the present invention, halogenated aliphatic hydrocarbon compounds and/or aromatic compounds can be decomposed more safely and efficiently.

DETAILED DESCRIPTION OF THE PREFERRED EMBODIMENTS

Figure 1:
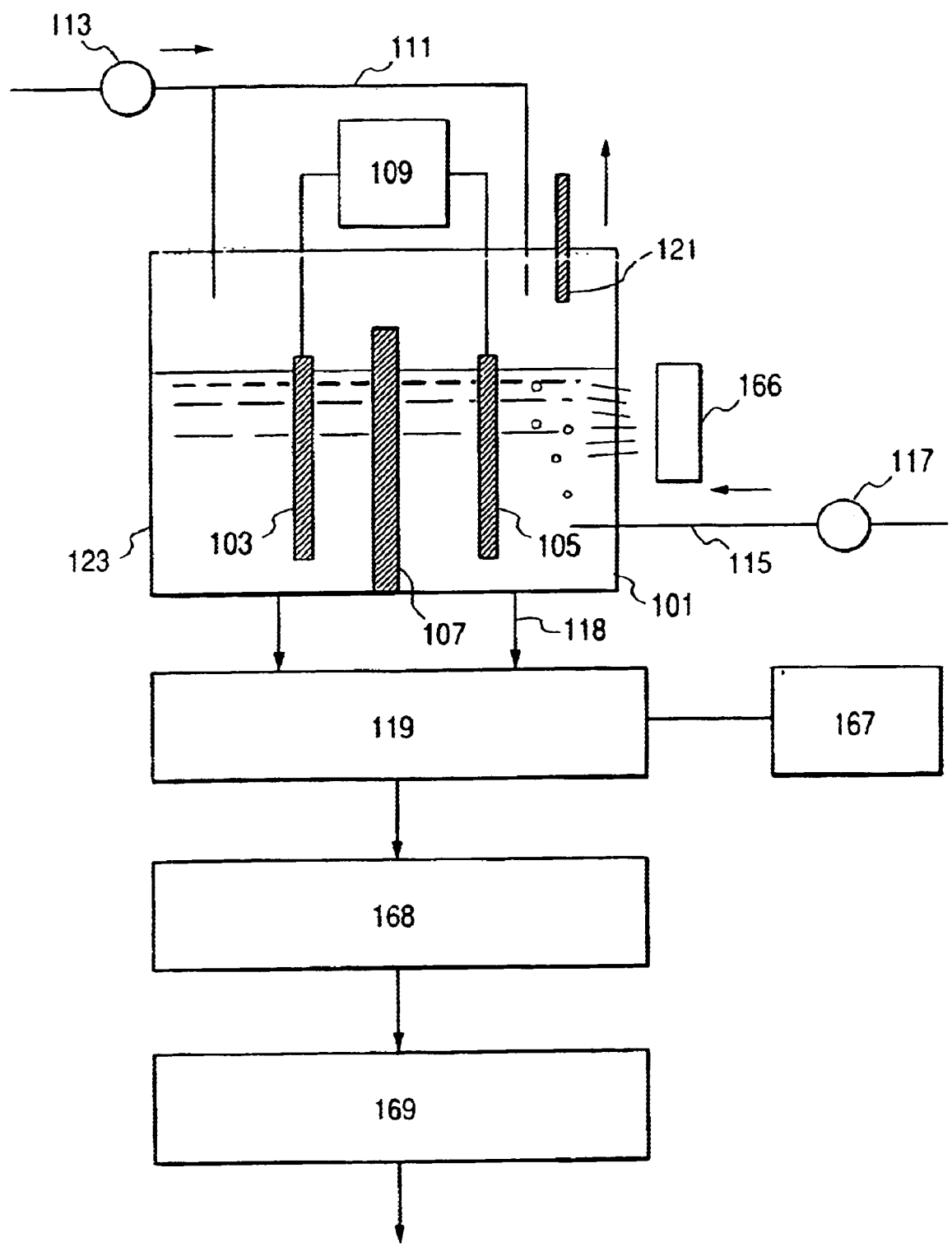
FIG. 1 is a schematic diagram of an embodiment of the apparatus of the present invention for decomposing halogenated aliphatic hydrocarbon compounds.

One method of the present invention for decomposing halogenated aliphatic hydrocarbon compounds or aromatic compounds or both (hereinafter referred to as the target substance) comprises the steps of:

(i) contacting the target substance with functional water produced by electrolysis of water containing an electrolyte under irradiation with light; and (ii) neutralizing the wastewater from the step (i) (a resulting solution after treatment of the step (i)).

Another method of the present invention for decomposing the target substance comprises the steps of:

(i) contacting the target substance with functional water containing hypochlorous acid under irradiation with light; and (ii) neutralizing the wastewater from the step (i).

Functional water can be obtained near the anode when an electrolyte (e.g. sodium chloride or potassium chloride) is dissolved into the source water and the solution is subjected to electrolysis in a water tank provided with a pair of electrodes. Functional water as used herein refers to water having a hydrogen ion concentration (pH) between 1 and 4, an oxidation-reduction potential between 800 mV and 1,500 mV when measured by using platinum and silver-silver chloride as the working and the reference electrodes respectively, and a chlorine concentration between 5 mg/liter and 150 mg/liter, preferably between 30 mg/liter and 120 mg/liter.

For preparing functional water having the above characteristic properties, the concentration of the electrolyte, for example, sodium chloride, in the source water prior to electrolysis is preferably between 20 mg/l and 2,000 mg/l and the electrolytic current is preferably between 2A and 20A. To obtain such functional water, any commercially available strongly acidic electrolytic water generator (e.g., OASYS Bio HALF: trade name, a product of Asahi Glass Engineering, or Strong Electrolytic Water Generator Model FW-200: trade name, a product of Amano) may be used.

Undesired mixing of the acidic functional water produced around the anode and the alkaline water produced around the cathode can be prevented by providing a diaphragm between the paired electrodes, to effectively obtain acidic functional water that can efficiently decompose the target substance. Such a diaphragm may suitably be an ion exchange membrane.

Functional water which contains hypochlorous acid can be also used for the present invention, which is almost as effective as the functional water prepared by electrolysis in decomposing the target substance. Specifically, an aqueous solution containing 0.001 N–0.1 N hydrochloric acid, 0.005 N–0.02 N sodium chloride and 0.0001 M–0.1 M sodium hypochlorite can be effectively used to decompose the target substance.

Also, functional water with a pH value not higher than 4.0 and a chlorine concentration not lower than 2 mg/l may be prepared by using hydrochloric acid and hypochlorite. Hydrochloric acid may be replaced by some other inorganic acid or by an organic acid. Inorganic acids that can be used for the purpose of the invention include hydrofluoric acid, sulfuric acid, phosphoric acid and boric acid, whereas organic acids that can be used for the purpose of the invention include acetic acid, formic acid, malic acid, citric acid and oxalic acid. A commercially available weak acidic functional water-generating powder (e.g., Kino-san 21X: trade name, a product of Clean Chemical) typically containing $N_3C_3O_3NaCl_2$ may also be used for preparing functional water. Such functional water prepared by formulation has an ability of decomposing the target substance when irradiated with light, as with the functional water prepared by electrolysis, although the capability may vary in efficiency. Source water in which these agents are dissolved refers to tap water, river water or sea water. Such water typically shows a pH value between 6 and 8 and a chlorine concentration of less than 1 mg/l at maximum and hence does not have any ability of decomposing the target substance.

Examples of halogenated aliphatic hydrocarbon compounds to be decomposed by a method according to the invention include aliphatic hydrocarbon compounds substituted by at least either chlorine or fluorine atom. Specific examples include 1 to 4 chlorine atom-substituted methane, 1 to 6 chlorine atom-substituted ethane, 1 to 4 chlorine atom-substituted ethylene, 1 to 2 chlorine atom-substituted acetylene, 1 to 8 chlorine atom-substituted propane, 1 to 6 chlorine atom-substituted propylene, 1 to 4 chlorine atom-substituted allene (propadiene), 1 to 4 chlorine atom-substituted allylene (methylacetylene), 1 to 10 chlorine atom-substituted butane, 1 to 8 chlorine atom-substituted 1-, 2- or iso-butene and 1 to 6 chlorine atom-substituted 1,3-butadiene.

More specifically, examples of such chlorine-substituted products include trichlorofluoromethane (CFC-11), dichlorofluoromethane (CFC-12), chlorotrifluoromethane (CFC-13), bromotrifluoromethane (CFC-13B1), carbon tetrafluoride (CFC-14), dichlorofluoromethane (CFC-21), chlorodifluoromethane (CFC-22), trifluoromethane (CFC-23), 1,2-difluoro-1,1,2,2-tetrachloroethane, 1,1,2-trichloro-1,2,2-trifluoroethane (CFC-113), 1,2-dibromo-1-chloro-1,2,2-trifluoroethane (CFC-113B2), 1,2-dichloro-1,1,2,2-tetrafluoroethane (CFC-114), 1,2-dibromo-1,1,2,2-tetrafluoroethane (CFC-114B2), 2,2-dichloro-1,1,1-trifluoroethane (CFC-123), chlorodifluoroethane (CFC-142), 1,1-difluoroethane (CFC-152), tetrafluoroethane, chloropentafluoroethane and hexafluoroethane (CFC-116). Additionally, azeotropic mixtures of any of the above listed compounds (e.g., CFC-500 and CFC-502), vinylfluoride, vinylidenefluoride, hexafluoropropylene, tetrafluoroethylene, chlorotrifluoroethylene and propylene hexafluoride may also be decomposed by a method according to the invention. Still additionally, halogenated aliphatic hydrocarbon compounds of not more than three carbon atoms substituted with at least one halogen atom selected from fluorine, chlorine and bromine may also be decomposed by a method according to the invention.

Specific examples of aromatic compounds that can be decomposed by a method according to the invention include benzene, halogenated cyclic hydrocarbons or aromatic hydrocarbons such as benzene trifluoride, perfluorobenzene and perfluoromethyldecalin. Biphenyls can be decomposed by a method according to the invention. Specific examples of such biphenyl compounds include biphenyl, dehydrodivanilic acid, 2-chlorobiphenyl, 3-chlorobiphenyl, 4-chlorobiphenyl, 2,2'-dichlorobiphenyl, 3,3'-dichlorobiphenyl, 4,4'-dichlorobiphenyl, 2,4'-dichlorobiphenyl, 2,3-dichlorobiphenyl, 2,4-dichlorobiphenyl, 2,5-dichlorobiphenyl, 2,6-dichlorobiphenyl, 3,4-dichlorobiphenyl, 3,5-dichlorobiphenyl, 2,4,4'-trichlorobiphenyl, 2,2',5-trichlorobiphenyl, 2,3',5-trichlorobiphenyl, 2,4',5-trichlorobiphenyl, 2',3,4-trichlorobiphenyl, 2,3,4-trichlorobiphenyl, 2,3,6-trichlorobiphenyl, 2,4,5-trichlorobiphenyl and 2,4,6-trichlorobiphenyl. Additionally, compounds obtained by replacing any of the chlorine atoms of any of the above listed biphenyl compounds with a fluorine or bromine atom may also be decomposed by the method according to the invention.

Any compounds may be used as a target substance to be decomposed in the present invention, so long as it can be decomposed by the functional water and light irradiation.

Irradiation light for decomposing the target substance in functional water preferably has a wavelength between 300 and 500 nm, more preferably between 350 and 450 nm. From the viewpoint of decomposition efficiency, the intensity of irradiation to a mixture of functional water and the target substance to be decomposed is preferably between 10 $\mu W/cm^2$ and 10 $mW/cm^2$, more preferably between 50 $\mu W/cm^2$ and 5 $mW/cm^2$. For example, light from a light source with a peak wavelength of 365 nm and an intensity of several hundreds $\mu W/cm^2$ (as measured in a wavelength range between 300 nm and 400 nm) is sufficient for decomposing the target substance in practical applications. Either natural light (e.g., sun light) or artificial light (from a mercury lamp, a black lamp or a color (e.g., blue) fluorescent lamp) can be used for the purpose of the invention.

Irradiation can be carried out either directly in the reactor container or from the outside through a transparent container wall. In the embodiments of the present invention, it is not necessary to use beams that may adversely affect the human body (e.g., UV light of a wavelength of 250 nm or smaller), so that glass or plastic can be used for the reactor container.

Neutralization Step

On completion, or near completion, of the decomposition step (i), the wastewater resulting from the step (i) is neutralized in the step (ii). More concretely, water containing the decomposition product (e.g., halogenated acid such as dichloroacetic acid) derived from the target substance after treatment with the functional water and light irradiation, is neutralized to pH 5 or higher, more preferably pH 6 to 8.

The mechanism of the decomposition of the target substance in contact with functional water under light irradiation is still unknown, but presumably the halogenated aliphatic hydrocarbon or aromatic compound is decomposed by the action of chlorine radicals formed from chlorine of hypochlorous acid by photoexcitation. Therefore, the functional water used for decomposition is acidic in many cases, and the wastewater also remains acidic after the decomposition. The release of the acidic wastewater may cause environmental problems, even if the target substance has been completely decomposed. Such a concern can be solved by neutralizing the wastewater from the step (i).

For the neutralization step, alkaline water formed around the cathode during electrolysis of an aqueous electrolyte solution can be used. When acidic functional water produced by electrolysis of an electrolyte solution is used as the functional water, alkaline water is concomitantly produced. Thus, alkaline water is preferably used for the neutralization step, in view of effective utilization of resources.

The residual chlorine concentration of the wastewater from the decomposition step is supposedly 1 mg/l or less, if the function of the functional water to decompose a halogenated compound has been fully exploited. However, when the wastewater still having decomposing activity is discharged, it is preferable to reduce residual chlorine concentration of the wastewater to 1 mg/l or less by a proper method, e.g., aeration or irradiation of light before discharge, more preferably to an extent not to hamper the activities of microorganisms in the environment.

The wastewater may be released directly to the environment after the residual chlorine concentration is reduced not to hamper the activities of microorganisms in the environment. However, the neutralization step may be followed by a microbial treatment step. For example, the inventors of the present invention have found that halogenated acetic acid is formed as the decomposition by-product, when a halogenated aliphatic hydrocarbon is decomposed in accordance with the method of the present invention. For example, dichloroacetic and trichloroacetic acid may be produced when TCE and PCE are decomposed, respectively. Wastewater discharged from the process based on the method of the present invention may contain such halogenated acids in a trace amount. In such a case, the wastewater can be further processed by using a halo acid-degrading microorganism to a level more pliable to the environment, to make the decomposition process more harmless to the environment.

Any type of microorganism may be used in the present invention, so long as it can decompose the decomposition product, and activated sludge or soil microorganisms can be used. When the degradation product is a halogenated acid (e.g., dichloroacetic acid), it can be decomposed by common activated sludge. Thus, the microbial treatment of the wastewater containing dichloroacetic acid is to introduce it into an activated sludge tank. The inventors of the present invention have confirmed that trichloroacetic acid can be also decomposed in an activated sludge tank. It is known, as mentioned above, that dichloroacetic acid can be easily decomposed by aerobic microorganisms. The microorganisms isolated and identified so far and useful for the present invention include Xanthobactor autotrophicus GJ10 (Heinz, U. and Rehm, H-J., Applied Microbiology and Biotechnology, 40, 158–164). The applicants of the present invention have discovered Renobactor sp. strain AC, FERM BP-5353, highly efficient in decomposing halogenated acid such as dichloroacetic and trichloroacetic acid, which is described in detail in the specification of Japanese Patent Application Laid-Open No.140665/1996. It is one of the most suitable microorganisms to be used in the present invention. The complete taxonomical description of FERM BP-5353 is as follows (the identification criteria: according to Barge's Manual (1984)):

A. Morphology
  Gram stain: negative
  Cell size and shape: Length: 1.0 to 2.0 $\mu$m, width: 0.2 to 0.5 $\mu$m, C- or S-shaped rod
  Mobility: No mobility
  Colony color: White to cream
B. Growth Conditions in Different Culture Media
  BHIA: Good
  MacConkey: Poor
C. Optimum Growth Temperature: 25 to 35° C.
D. Physiological Properties
  Aerobic or anaerobic: Aerobic
  TSI (slant/butt): alkali/alkali, $H_2S$ (−)
  Oxidase: Positive
  Catalase: Positive As described above, the decomposition method of the present invention includes a neutralization step. This step, however, can be dispensed with, when the wastewater from the decomposition step will not affect the subsequent microbial decomposition step of halo acids.

When the microbial decomposition step is included in the process, it needs to adjust the pH of the wastewater in the preceding neutralizing step not to a level having no effect to the environment but to a level not hampering the microbial activities, considering that the wastewater is diluted in the microbial decomposition step.

Adjustment of pH may be carried out to the discharge from the microbial treatment step before the final release into the environment. For example, if the wastewater containing trichloroacetic acid as a decomposition product after the functional water treatment is adjusted to have a pH of around 4–9, preferably 6–8, the microorganism in an activated sludge tank will be hardly affected.

Next, for the purpose of the invention, the constitution of an apparatus for decomposing the target substance can be as described in 1) or 2) below.

1)—Target Substance to be decomposed is directly introduced into an electrolytic water-generating unit, and the acidic functional water mixed with the target substance is irradiated with light.

FIG. 1 is a schematic block diagram of an embodiment of the apparatus for decomposing the target substance according to the invention. In FIG. 1, reference numeral 101 denotes a water tank. The water tank 101 is provided with an anode 105, a cathode 103, a diaphragm 107 which may be made of an ion exchange membrane, a power source 109 connected to the electrodes, a set of a pipe 111 and a pump 113 for supplying an aqueous electrolyte solution into the water tank and another set of a pipe 115 and a pump 117 for supplying the target substance or a medium containing it. Reference numeral 119 denotes a tank for collecting the functional water, which has lost its activity after the reaction with the target substance and for mixing it with the alkaline functional water generated around the cathode 103. Reference numeral 167 denotes pH controlling means to adjust the pH of the mixed solution to pH 6–8, reference numeral 168 denotes means to reduce the residual chlorine concentration of the mixed solution to 1 mg/l or less, e.g., an aeration tank. This aeration means can be replaced with light irradiation means or both means can be used. Reference numeral 169 denotes a microbial treatment tank to treat the decomposition product containing solution.

First, an aqueous electrolyte solution is supplied to fill the water tank 101. When power is supplied to the electrodes 103 and 105 for electrolysis, functional water is generated around the anode 105. The target substance can be supplied continuously at a desired flow rate to the compartment having the anode 105 of the water tank 101 through the pipe 115, while the functional water is irradiated with light from a light source 166 arranged at the water tank 101. Then, the target substance comes in contact with the functional water and is decomposed in an accelerated manner by irradiation. The decomposed gas is discharged through a gas discharge pipe 121. When no gas is discharged, a discharge pipe 121 is not necessary.

The functional water that has lost its activity as a result of the reaction with the target substance is discharged into the tank 119 from the water tank 101 by way of a water discharge pipe 118 to be mixed with the alkaline functional water generated around the cathode 103. The mixture in the tank 119 is adjusted to a pH level of around 7, by a pH controlling means 167, as required.

Then the mixture is introduced into the aeration tank 168, where remaining chlorine in the mixture is driven off from the mixture, and then into the microbial treatment tank 169, where the decomposition product is further decomposed by the microorganisms. Any type of microorganism may be used, so long as it can decompose the decomposition product. Activated sludge is useful for the present invention, and preferable because of its simplicity.

As the diaphragm, suitably used is an ion exchange membrane which can restrain the movement of the electrolyte solution around the cathode 103 or the anode 105 toward the opposite electrode, and allows irreversible movement of positive ions (e.g., $Na^+$, $Ca^{2+}$, $Mg^{2+}$, $K^+$, etc.) from the anode side toward the cathode side and that of negative ions (e.g., $Cl^-$, $SO_4^{2-}$, $HCO_3^-$, etc.) from the cathode side toward the anode side. In other words, by using an ion exchange membrane for the diaphragm, functional water having the properties discussed later can be efficiently produced around the anode.

Figure 2:
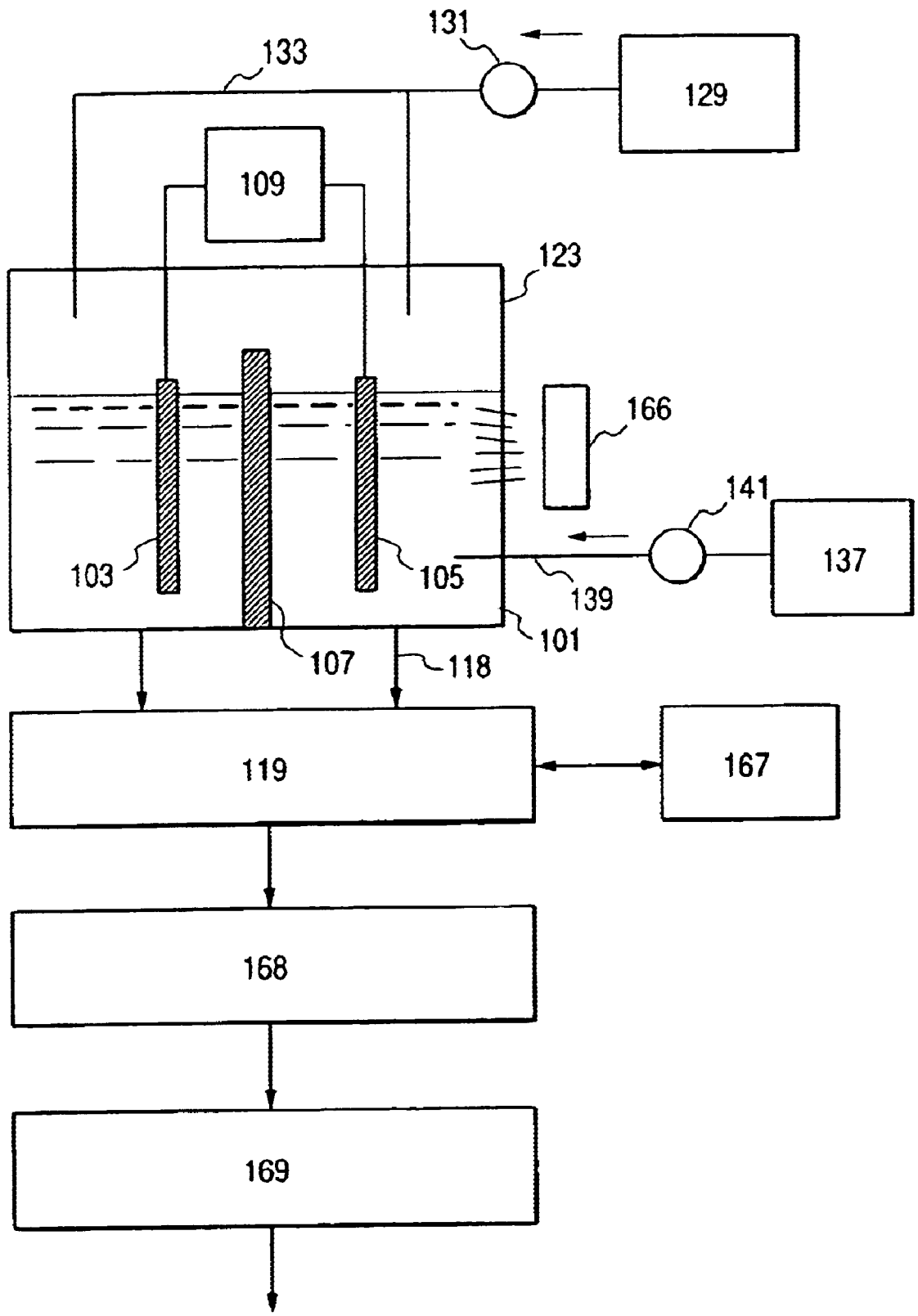
FIG. 2 is a schematic diagram of another embodiment of the apparatus of the present-invention for decomposing halogenated aliphatic hydrocarbon compounds.

FIG. 2 outlines another embodiment of the apparatus of the present invention to decompose the target substance in a liquid state or dissolved in a liquid medium, where reference numeral 137 denotes a tank to contain the liquid target substance or a liquid medium containing target substance, reference numerals 139 and 141 denote a pipe and a pump which supply the liquid held in the tank 137 to the functional water generator 123, reference numeral 129 denotes a tank holding an electrolyte solution, and reference numerals 131 and 133 denotes a pump and a pipe to supply the solution held in the tank 129 to the functional water generator 123.

2)—Functional water is produced in an electrolytic water production apparatus and transferred into a decomposition treatment tank where a target substance comes into contact with the functional water under irradiation.

Figure 5:
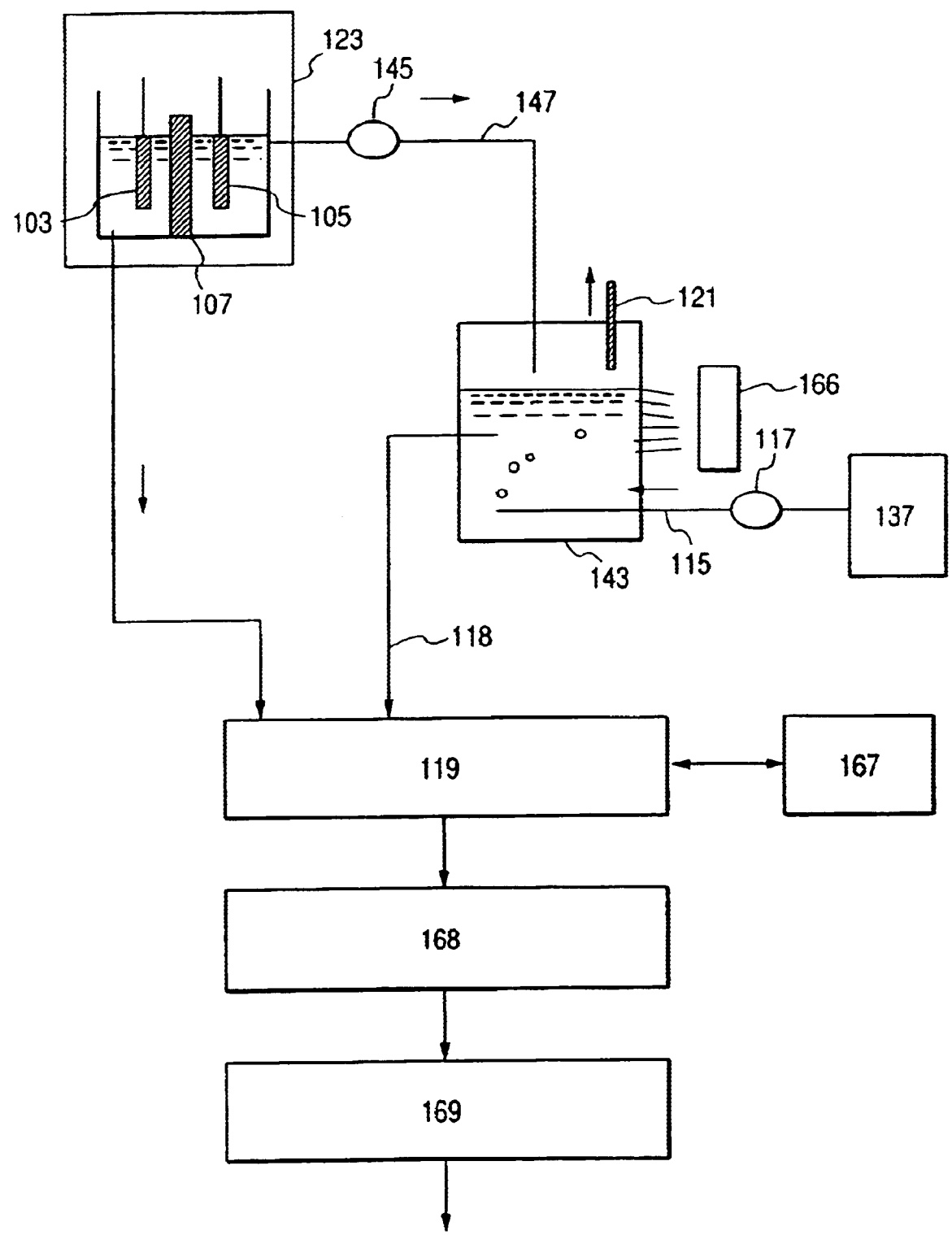
FIG. 5 is a schematic diagram of still another embodiment of the apparatus of the present invention for decomposing halogenated aliphatic hydrocarbon compounds.

FIG. 5 is a schematic diagram of one embodiment of the apparatus for decomposing a target substance according to the invention. Referring to FIG. 5, functional water produced at the anode side of the functional water-generating unit 123 is supplied continuously to the decomposition treatment tank 143 at a desired flow rate by way of a pump 145 and a pipe 147. A target substance, for example, gaseous chlorinated aliphatic hydrocarbon compounds, is also supplied continuously to the decomposition tank 143 at a desired flow rate by way of a feed pipe 115 and a pump 117, while the inside of the decomposition tank 143 is irradiated by means of a light irradiation unit 166. The target substance comes into contact with the functional water in the decomposition tank 143 and decomposition is accelerated by irradiation. The functional water used in the treatment is then discharged from the decomposition tank 143 into a tank 119. The purified gas is discharged through a discharge pipe 121.

The acidic functional water discharged from the decomposition tank 143 after the reaction via the pipe 118 into the tank 119 is then mixed with the alkaline functional water generated around the cathode 103. The mixture in the tank 119 is adjusted to a pH level of around 7, by the pH controlling means 167, as required.

The mixture is then introduced into the aeration tank 168, where remaining chlorine in the mixture is driven off, and then the mixture is transferred into the microbial treatment tank 169, where the decomposition product is further decomposed by the aid of the microorganisms. Any type of microorganism may be used, so long as it decomposes the decomposition product. Activated sludge is useful for the present invention, and preferable because of its simplicity.

Figure 4:
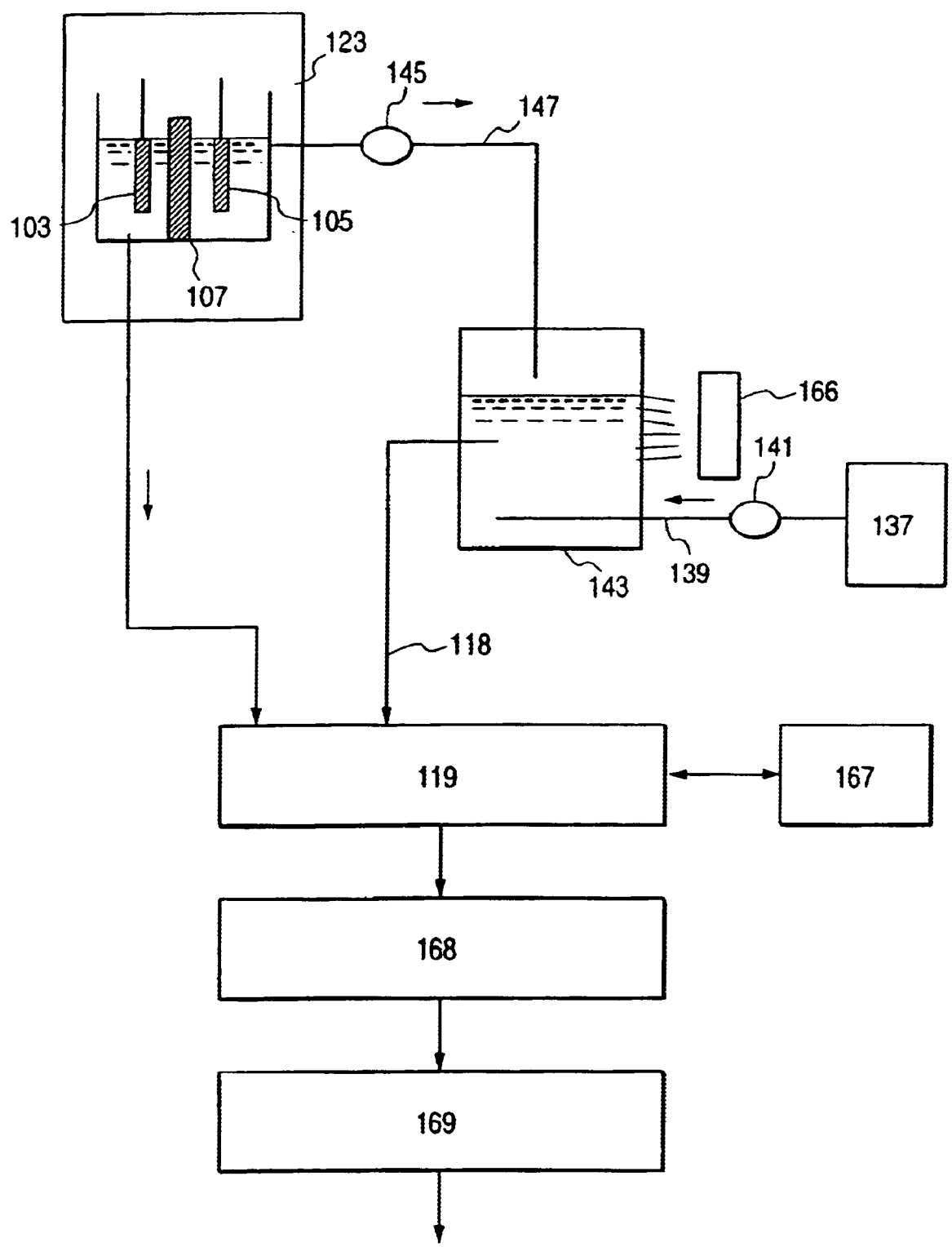
FIG. 4 is a schematic diagram of still another embodiment of the apparatus of the present invention for decomposing halogenated aliphatic hydrocarbon compounds.

FIG. 4 is a schematic block diagram of still another embodiment of the apparatus for decomposing a target substance according to the invention. Referring to FIG. 4, functional water produced in a functional water-generating unit 123 is supplied to a decomposition tank 143 by way of a pump 145 and a pipe 147. The target substance is fed from a tank 137 storing a liquid target substance or a liquid medium containing the target substance in a dissolved state to the decomposition tank 143 by way of a pump 141 and a pipe 139. The inside of the decomposition tank 143 is irradiated by means of a light irradiation unit 166. The target substance comes into contact with the function water and decomposition is accelerated by irradiation.

The acidic functional water is discharged from the decomposition tank 143 after the reaction via the pipe 118 into the tank 119 and mixed with the alkaline functional water generated around the cathode 103. The mixture in the tank 119 is adjusted to a pH level of around 7, by the pH controlling means 167, as required.

The mixture is introduced into the aeration tank 168, where remaining chlorine in the mixture is driven off, and then the mixture is transferred into the microbial treatment tank 169, where the decomposition product is further decomposed by the microorganism. Any type of microorganism may be used, so long as it can decompose the decomposition product. Activated sludge is useful for the present invention, and preferable because of its simplicity.

FIGS. 4 and 5 illustrate the embodiments which use the functional water generated by electrolysis. Alternatively, the functional water can be obtained by means of other than electrolysis. For example, the method of the present invention can use the functional water prepared by dissolving various agents in source water. In this case, the functional water is prepared in the generator 123 by dissolving the agent into source water, and sent to the decomposition tank 143 through the pump 145 and pipe 147. The functional water after used for the decomposition is adjusted to around pH 7 in the mixture tank 119 by the pH-adjusting means 167. The pH-adjusting is more preferable than mixing the alkaline functional water in this case.

Figure 3:
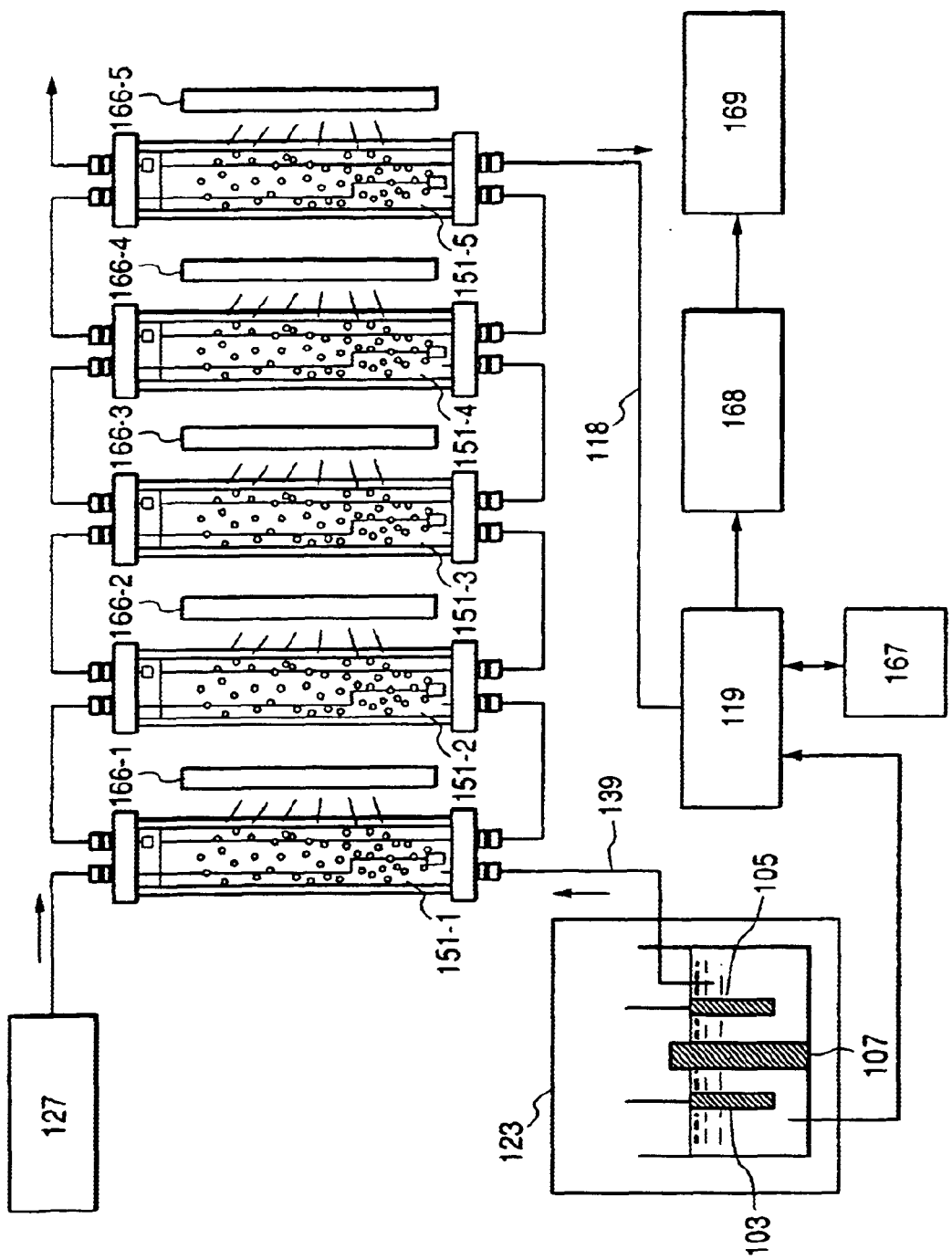
FIG. 3 is a schematic diagram of still another embodiment of the apparatus of the present invention for decomposing gaseous halogenated aliphatic hydrocarbon compounds.

FIG. 3 is a schematic block diagram of still another embodiment of the apparatus for decomposing a target substance according to the invention, directed to an easily gasifiable target substance such as trichloroethylene. Referring to FIG. 3, the embodiment comprises a functional water-generating unit 123, column-shaped decomposition tanks 151-1 through 151-5 for decomposing the target substance, light irradiation units 166-1 through 166-5 and a pipe and pump 139 for supplying acidic functional water produced by the functional water-generating unit 123 to the decomposition container 151-1. As shown in FIG. 3, the five decomposition tanks 151-1 through 151-5 are connected in tandem so that the target substance may contact acidic functional water for a prolonged period of time and any residual target substance that has not been decomposed in the upstream tank(s) 151-1 through 151-4 may be brought into contact with additional acidic functional water in the downstream tank(s) 151-2 through 151-5 under irradiation until they become completely decomposed. The number of decomposition tanks to be connected may be appropriately selected depending on the concentration and the degradability of the target substance involved, without specific limitation.

The functional water is discharged after the reaction via the pipe 118 into the tank 119 to be mixed with the alkaline functional water generated around the cathode 103. The mixture in the tank 119 is adjusted to a pH level of around 7, by the pH controlling means 167, as required.

The mixture is introduced into the aeration tank 168, where remaining chlorine is driven off from the mixture, and then the mixture is transferred into the microbial treatment tank 169, where the decomposition product is further decomposed by the microorganism. Any type of microorganism may be used, so long as it can decompose the decomposition product. Activated sludge is useful for the present invention, and preferable because of its simplicity.

Figure 6:
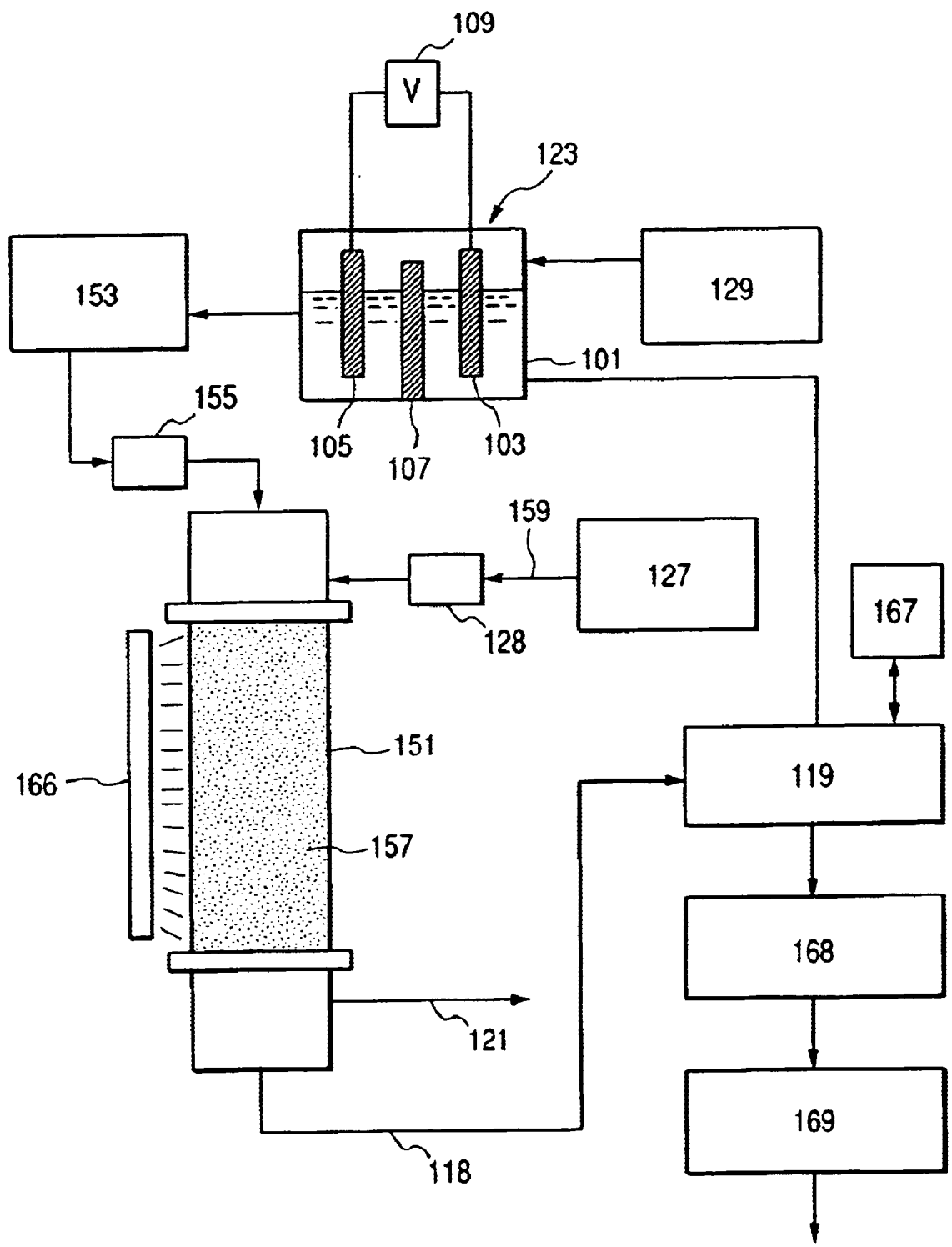
FIG. 6 is a schematic diagram of still another embodiment of the apparatus of the present invention for decomposing gaseous halogenated aliphatic hydrocarbon compounds.

If the target substance to be treated is in a gaseous state, an arrangement as shown in FIG. 6 may be used to reduce the length of the reaction vessel and increase the area and the period of contact between functional water and the target substance. Referring to FIG. 6, the embodiment comprises a reaction column 151 that is packed with a filler 157 that can adsorb the target substance. The embodiment also comprises a light irradiation unit 166 adapted to irradiate the inside of the reaction column 151, means 159 which is a pipe provided with a blower 128 for introducing gasified target substance into the reaction column 151, a functional water-generating unit 123 and a storage tank 153 for storing the functional water produced by the functional-water generating unit 123. The functional water stored in the storage tank 153 is fed dropwise into the reaction column 151 from the top by means of a pump 155. The gaseous target substance is introduced into the column 151 from its top. The functional water flows down along the filler in the column 151 and the gaseous target substance absorbed by the filler is decomposed in an accelerated manner under irradiation.

The functional water is discharged from the column 151 after the reaction and sent via the pipe 118 into the tank 119 to be mixed with the alkaline functional water generated around the cathode 103. The mixture in the tank 119 is adjusted to a pH level of around 7, by the pH controlling means 167, as required.

The mixture is introduced into the aeration tank 168, where remaining chlorine in the mixture is driven off from the mixture, and then into the microbial treatment tank 169, where the decomposition product is further decomposed by the microorganism. Any type of microorganism may be used, so long as it can decompose the decomposition product. Activated sludge is useful for the present invention, and preferable because of its simplicity.

Any filler may be used in this embodiment so long as it can provide an increased contact area for functional water and a target substance. It may be in porous, hollow or spherical shape made of an inorganic or organic material. Any particular filler used in the chemical industry, the pharmaceutical industry, the food industry and/or waste water treatment systems may be used for the purpose of the invention.

The above described embodiments of apparatus according to the invention can decompose gaseous target substance, and applicable to a process for purifying exhaust gas discharged from of various industrial plants or refuse incineration plants.

Combustion gas discharged from industrial plants and refuse incineration systems typically contains various halogenated aliphatic hydrocarbon compounds and aromatic compounds as well as soot and smoke. Since fine dust may cause diseases in the respiratory tract, and benzpyrene and dioxin are strongly carcinogenic and mutagenic, it is a very important technical problem to purify exhaust gas and remove such harmful substances therefrom. In known processes for removing harmful substances, typically used are exhaust gas treatment apparatuses for dust collection, denitrification, desulfurization, dechlorination and so on, which are connected in tandem. In these processes, halogenated aliphatic hydrocarbon compounds and aromatic compounds are removed individually and stepwise. For instance, Japanese Patent Application Laid-Open No. 5-115722 describes a purification method for halogenated aliphatic hydrocarbon compounds and aromatic compounds, using exhaust gas filters typically made of zeolite or ceramic of improved mechanical strength, shock-resistance and capture efficiency for the harmful substance. While such known processes can collect relatively large particles, they cannot practically remove molecular halogenated aliphatic hydrocarbon compounds or aromatic compounds because they simply rely on a filtering effect for purifying the exhaust gas.

On the other hand, there are proposed a number of apparatuses for purifying exhaust gas containing halogenated aliphatic hydrocarbon compounds and aromatic compounds by contacting it with a catalyst. For example, Japanese Patent Application Laid-Open No. 5-149127 discloses a method and an apparatus for rendering soot and harmful compounds such as halogenated aliphatic hydrocarbon compounds or aromatic compounds contained in exhaust gas harmless by means of an oxidation catalyst and a heater therefor. The size of such an apparatus depends on the volume of exhaust gas to be treated and the quantity of the target substance contained in it. Therefore, systems equipped with a heating apparatus become considerably large in size with high running cost, since exhaust gas is discharged at a rate of 50 to 500 $m^3/h$ from a refuse incineration furnace or from a facility to extract contaminated gas from soil. Japanese Patent Application Laid-Open No. 6-246133 describes a method of heating and decomposing aliphatic hydrocarbon compounds or aromatic compounds by generating a corona discharge in exhaust gas. Both methods can decompose soot particles as well as low to high molecular weight halogenated aliphatic hydrocarbon compounds or aromatic compound, to make them harmless. However, the concentration of harmful substances contained in the exhaust gas changes time to time and even when the pollutant concentration of the exhaust gas is low, continuous heating, high frequency application or corona discharge is required for a considerably long period. Therefore, there is a problem in the efficiency of energy consumption. Additionally, it is difficult to treat these compounds in high concentration by using any of the above oxidization processes, unless a number of apparatuses are arranged in parallel or in tandem to alleviate the load to each apparatus.

Methods and apparatuses using microorganisms have been proposed for purifying exhaust gas economically and with a relatively small environmental load. For instance, U.S. Pat. No. 4,009,099 describes a method for purifying exhaust gas by decomposing gaseous contaminants as well as soot particles by means of microorganisms. U.S. Pat. No. 5,494,574 describes a method for purifying polluted water or gas containing harmful halogenated aliphatic hydrocarbon compounds or aromatic compounds by circulating a filler onto which microorganisms are fixed in the reaction tank, while polluted water or gas passes through the tank. However, these methods have problems that the assimilation capability of the microorganisms limits the types of the target compounds to be decomposed and that the decomposition process takes a relatively long time.

Contrary to the above described known techniques, the method of the present invention can efficiently decompose the target substance simply by bringing them into contact with functional water and irradiating them with light. Therefore, this will be a very effective technology for purifying exhaust gas, since some of the halogenated aliphatic hydrocarbons contained in the exhaust gas can be reliably decomposed simply by contacting the exhaust gas with functional water and irradiating them with light. When a method of decomposing a target substance according to the invention is used for purifying exhaust gas, an apparatus having a constitution shown in, FIG. 6 as described above or FIG. 7 as described below, may suitably be employed.

Figure 7:
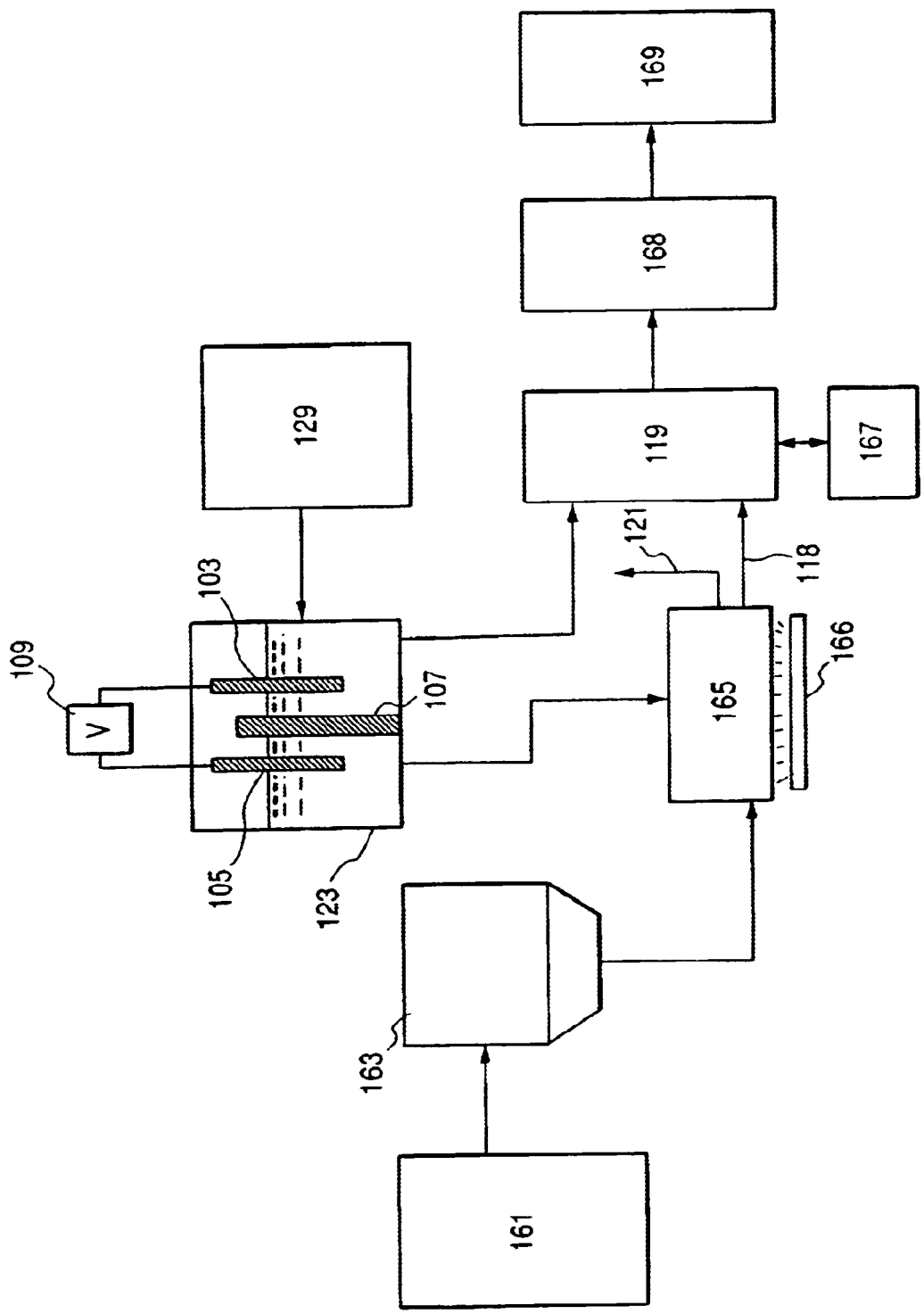
FIG. 7 is a schematic diagram of one embodiment of the apparatus of the present invention for purifying exhaust gases.

FIG. 7 shows a refuse incinerator 161, a device 163 (e.g., electric dust collector) for removing soot from exhaust gas emitted from the incinerator 161, a functional water-generating unit 123, a reaction tank 165 where functional water and the exhaust gas from which powdery dust has been removed react, and a light irradiation unit 166 for irradiating the inside of the reaction tank. There is also provided a storage means 129 for storing an aqueous electrolyte solution necessary for producing functional water (prepared by dissolving a water-soluble electrolyte into source water). The soot removing device 163 is to remove soot particles contained in a large amount in exhaust gas discharged from the incinerator 161, and the collected soot particles can be taken out from the device. Functional water produced around the anode of the functional water-generating unit 123 is supplied to the reaction tank 165, where exhaust gas and functional water can efficiently contact each other. A light irradiation unit 166 is provided inside or outside of the tank 165 to promote decomposition of the target substance. The reaction tank 165 is also provided with a gas discharge port 121 for discharging purified exhaust gas from which the target substance has been removed.

Next, the process is explained. First, exhaust gas coming from the refuse incinerator 161 is introduced into the dust collector 163, where most of the soot particles contained in the exhaust gas are removed. An aqueous electrolyte solution is supplied from the storage tank 129 to the functional water-generating means 123 to be electrolyzed there. Functional water produced around the anode of the means 123 is supplied to the reaction tank 165. Exhaust gas and functional water come into contact in the reaction tank 165 and are irradiated with light by the light irradiation unit 166 so that the target substance contained in the exhaust gas is decomposed. Then, the treated exhaust gas is discharged from the gas discharge port 121 and the functional water used for treating the target substance is also discharged from a water discharge port 118.

The functional water after the reaction is sent via the pipe 118 into the tank 119 to be mixed with the alkaline functional water generated around the cathode 103. The mixture in the tank 119 is adjusted to a pH level of around 7, by the pH controlling means 167, as required.

The mixture is introduced into the aeration tank 168, where remaining chlorine in the mixture is driven off from the mixture, and then into the microbial treatment tank 169, where the decomposition product is further decomposed by the microorganism. Any type of microorganism may be used, so long as it can decompose the decomposition product. Activated sludge is useful for the present invention, and preferable because of its simplicity.

When an exhaust gas treatment apparatus having a configuration as described above was actually used for treating exhaust gas from a refuse incinerator, 99 to 99.7% of the target substance contained in the exhaust gas was decomposed. Thus, the excellent purifying potential for exhaust gas of the apparatus is clear. Additionally, although the used functional water is discharged from the water discharge port 118 in the configuration of FIG. 6 or 7, it may be subjected to a filtering and/or precipitation process when it contains solid matter such as soot particles in an large amount.

FIGS. 6 and 7 illustrate the embodiments which use the functional water generated by electrolysis. However, other than electrolysis, functional water can be obtained by dissolving various agents in source water in the present invention. In the apparatus shown in FIG. 6, functional water may be produced by dissolving an agent in the functional water generator 123 and sent to the reactor column 151 via the functional water holding tank 153. The used functional water is sent to the mixture tank 119 and adjusted at a pH level of around 7 by the pH-adjusting means 167, not using alkaline functional water. In the apparatus shown in FIG. 7, functional water may be produced by dissolving an agent in the functional water generator 123 and sent to the reaction vessel 165. The used functional water is sent to the mixture tank 119 and adjusted at a pH level of around 7 by the pH-adjusting means 167, not using alkaline functional water.

When exhaust gas is purified by means of an apparatus as shown in FIG. 6, the rates at which functional water and exhaust gas are supplied are preferably regulated so that the volume percentage of exhaust gas in the reaction column exceeds 0.5, in order to increase the gas/liquid contact area and the average retention time of exhaust gas.

Applicable areas of the present invention are not limited to the above described embodiments. For example, the present invention is applicable not only to exhaust gases discharged from garbage incinerators, but also to general exhaust gases, e.g., those discharged from vehicles.

As described above, the present invention can be used to decompose a halogenated aliphatic hydrocarbon and/or aromatic compound economically and safely under normal temperature and pressure. It can be also used to purify exhaust gases containing a variety of halogenated aliphatic hydrocarbon and aromatic compounds.

The present invention is described more concretely by following Examples.

EXAMPLE 1

Apparatus for Decomposing Gaseous Trichloroethylene (TCE)

An apparatus as illustrated in FIG. 1 was prepared. A gas inlet pipe 115 was provided to introduce gaseous TCE into the anode side of a strongly acidic functional water generating apparatus 123 (Strong Functional Water Generator (Model FW200): a product of Amano). Then, the inlet pipe 115 was connected to a gas supply unit (standard gas generator, Gastec PD-18: tradename) for providing air containing TCE. A set of a pump 113 and a pipe 111 was installed to supply an aqueous electrolyte solution to the apparatus 123 from a tank storing the solution. Then, a water tank 101 of the apparatus 123 was filled with the electrolyte solution. Subsequently, air containing 700 ppm TCE was continuously fed into the apparatus 123 at a flow rate of 50 ml/min, while the apparatus was running. It was confirmed that functional water produced around the anode 105 has a pH value of 2.1, an oxidation-reduction potential of 1,150 mV and a residual chlorine concentration of 54 mg/l. The inside of the water tank 101 was irradiated with light emitted from a light irradiation means 166 (black light fluorescent lamp FL10BLB: a product of Toshiba, 10 W). The wastewater discharged from the discharge port 118 provided at the anode 105 side of the apparatus 123 was stored in a waste tank 119, from which TCE was extracted with hexane and the TCE concentration of the wastewater was determined by gas chromatography with an ECD detector (GC-14B: a product of Shimadzu Seisakusho). TCE concentration was less than 0.03 ppm, but dichloroacetic acid was found at a concentration of 3.2 ppm. The TCE concentration of the gas discharged through the discharge pipe 121 was also determined by gas chromatography with an FID detector (GC-14B: a product of Shimadzu Seisakusho; DB-624 column: a product of J&W). The TCE concentration in the discharged gas was less than 1 ppm. The wastewater discharged from the discharge port 118 was mixed in the tank 119 with the alkaline functional water generated at the cathode 103 compartment. The mixture had a pH of 7.1. It was sent to the aeration tank 168, where it was aerated at 200 ml/min to a chlorine concentration level of 0.5 ppm or less.

The mixture was then sent to the microbial treatment tank 169, containing soil and soil microorganisms collected in Morinoichi, Atsugi-shi, Kanagawa Prefecture, Japan. It was treated with the microorganisms for 6 hours. As a result, the peak of dichloroacetic acid, presumably due to TCE degradation disappeared.

EXAMPLE 2

Apparatus to Decompose a Synthetic Contaminated Solution

An apparatus as shown in FIG. 2 was assembled incorporating a strongly acidic functional water-generating apparatus 123 (Strong Electrolytic Water Generator (Model FW200): a product of Amano). A set of a pipe 139 and a pump 141 was arranged in such a way that a synthetic contaminated solution was supplied from a tank 137 to the compartment of the anode 105 of the water tank 101 of the apparatus 123. An aqueous electrolyte solution was supplied to the water tank 101 from a storage tank 129 by way of a set of a feed pump 131 and a pipe 133. A synthetic contaminated solution of the following composition was put into the tank 137.
Composition of Contaminated Synthetic Solution

| TCE | 600 mg |
|---|---|
| PCE | 500 mg |
| chloroform | 20 mg |
| water | 1 liter |

After filling the water tank 101 with the synthetic contaminated solution and the aqueous electrolyte solution, the apparatus 123 was operated under conditions to produce functional water having a pH value of 2.1, an oxidation-reduction potential of 1,100 mV and a residual chlorine concentration of 50 mg/l, by electrolyzing for 11 minutes an electrolyte solution of 1000 mg/l, while the inside of the water tank 101 was irradiated with light emitted from a light irradiation means 166 (black light fluorescent lamp FL10BLB: a product of Toshiba, 10 W) at an intensity of 0.5–0.8 mW/cm$^2$.

After one hour operation, the wastewater discharged from the discharge port 118 of the water tank 101 was stored in a waste tank 119 and the concentrations of TCE, PCE and chloroform of the waste solution were measured. As a result, they were all less than 0.1 ppm. However, there were found dichloroacetic acid and trichloroacetic acid, presumably decomposition products of TCE and PCE, at 12 and 10 ppm, respectively.

The wastewater discharged from the discharge port 118 was mixed in the tank 119 with the alkaline functional water generated at the compartment of the cathode 103. The mixture had a pH of 7.1.

Then it was sent to the aeration tank 168 and aerated at 200 ml/min to achieve a chlorine concentration level of 0.5 ppm or less.

The wastewater was then sent to the microbial treatment tank 169, containing activated sludge collected from the waste water treatment tank at Canon Central Research Center. Microbial treatment was carried out for 3 hours. As a result, the peaks of dichloroacetic acid and trichloroacetic acid, presumably due to the degradation of TCE and PCE disappeared.

EXAMPLE 3

Continuous Decomposition of Trichloroethylene (TCE) with Functional Water

In this example, an apparatus as shown in FIG. 3 was used for the experiment of decomposing TCE. The same strongly acidic functional water generating apparatus 123 as used in Example 1 was used to produce functional water having a pH value of 2.1, an oxidation-reduction potential of 1,150 mV and a residual chlorine concentration of 54 mg/l at the anode side thereof, which functional water was then continuously supplied to the decomposition column 151-1 at a flow rate of 100 ml/min by means of a pump 139. A decomposition column 151 comprised of 5 columns connected in series to provide a prolonged average retention time for TCE gas. Each column had a capacity of about 1,200 ml. Black light fluorescent lamps (FL10BLB: tradename, a product of Toshiba, 10 W) were used as light irradiation means 166-1 through 166-5 to irradiate the respective decomposition columns. The inside of each column was irradiated with light at an intensity of 0.5–0.8 mW/cm$^2$. Air containing gaseous 1700 ppm TCE was supplied continuously from a gas supply unit 127 (Standard Gas Generator, Gastec PD-1B: tradename) to the bottom of the decomposition column 151-1 at a flow rate of 100 ml/min. The functional water discharged from the discharge port 118 of the column 151-5 was stored in a waste tank 119. The TCE concentration of the gas discharged from a gas discharge port 121 was determined by gas chromatography. The TCE concentration in the discharged gas was 10–17 ppm. The used functional water discharged from the port 118 contained 8.0 ppm dichloroacetic acid.

The used functional water discharged from the port 118 was mixed in the tank 119 with the alkaline functional water generated at the cathode 103 side. The pH was 7.1 at this point. It was sent to the aeration tank 168, where it was aerated at 200 ml/min to a chlorine concentration level of 0.5 ppm or less.

The mixture was then sent to the microbial treatment tank 169, containing soil and soil microorganisms collected in Morinoichi, Atsugi-shi, Kanagawa Prefecture, Japan. Microbial treatment was carried out with a retention time of 6 hours. As a result, the peak of dichloroacetic acid, presumably due to TCE degradation disappeared.

EXAMPLE 4

Continuous Decomposition of Synthetic Contaminated Solution with Functional Water In this example, an experiment of decomposing halogenated aliphatic hydrocarbon compounds and aromatic compounds was conducted by using a decomposition apparatus as shown in FIG. 4. A strongly acidic functional water generating apparatus 123 (OASYS Bio HALF: tradename, a product of Asahi Glass Engineering) was used to produce functional water having a pH of 2.1, an oxidation-reduction potential of 1,150 mV and a residual chlorine concentration of 50 mg/l at the anode side thereof. This functional water was then continuously supplied to a decomposition tank 143 at a flow rate of 45 ml/min by means of a pump 145. Synthetic contaminated solution having the following composition was put into a tank 137, from which the solution was continuously fed to a decomposition tank 143. The inside of the container 143 was irradiated with light emitted from light irradiation means 166 (Black Light Fluorescent Lamp (FL10BLB: tradename, a product of Toshiba, 10 W)) at an intensity of 0.5–0.8 mW/cm$^2$.

Composition of Synthetic Contaminated Solution

| | |
|---|---|
| TCE | 600 mg |
| PCE | 500 mg |
| chloroform | 20 mg |
| water | 1 liter |

The decomposition tank 143 had a capacity of about 6,000 ml for the mixture and the average retention time of TCE was 2 hours. The functional water discharged from the discharge port 118 of the tank 143 was stored in a waste tank 119 and the concentrations of TCE, PCE and chloroform contained in the wastewater were determined by gas chromatography. As a result, they were less than 0.1 ppm, but there were observed slight peaks of dichloroacetic acid and trichloroacetic acid presumably due to the decomposition of TCE and PCE, respectively.

The used functional water discharged from the port 118 was mixed in the tank 119 with the alkaline functional water generated at the cathode 103 compartment. The pH was 7.1 at this point. It was sent to the aeration tank 168, where it was aerated at 200 ml/min to a chlorine concentration level of 0.5 ppm or less.

The mixture was then sent to the microbial treatment tank 169, containing soil and soil microorganisms collected in Morinoichi, Atsugi-shi, Kanagawa Prefecture, Japan and adapted. Microbial treatment was carried out with a retention time of 6 hours. As a result, the peaks of dichloroacetic acid and trichloroacetic acid disappeared.

EXAMPLE 5

Purification of Exhaust Gas Containing Halogenated Aliphatic Hydrocarbon Compounds and Aromatic Compounds by Functional Electrolytic Water and Light Irradiation A simulation experiment for purifying exhaust gas was conducted by using an apparatus for decomposing gaseous halogenated aliphatic hydrocarbon compounds by using functional water as shown in FIG. 6. Functional water prepared at the compartment of the anode 105 of a functional water generator 123 (OASYS Bio HALF: tradename, a product of Asahi Glass Engineering) was stored in a storage tank 153, from which functional water was sent by means of a pump 155 at a flow rate of 100 ml/min to flow down in a reaction column 151. The reaction column 151 was 100 cm long and 10 cm in diameter, and filled with a filler (Biscopal: a product of Rengo, particle diameter: 2 mm) at a density of 0.1 g/cm$^3$.

As a model exhaust gas, air containing soot particles, ethylene chloride, benzene, phenol, trichloroethylene and tetrachloroethylene to respective concentrations as listed in Table 1 (hereinafter referred to as "exhaust gas") was prepared. The reaction column 151 is provided at the top thereof with an inlet port for functional water and an inlet port for exhaust gas and at the bottom thereof with a gas discharge port and a water discharge port. The model exhaust gas was supplied to the reaction column 151 at a rate of 15 ml/min, while functional water was introduced at a rate of 100 ml/min. The functional water was obtained by electrolysis of electrolyte-containing water and has a pH of 2.1, an oxidation-reduction potential of 1,000 mV with a working electrode of platinum and a reference electrode of silver-silver chloride, and a chlorine concentration was 45 mg/l. The functional water and the exhaust gas were brought into contact on the surface of the filler under irradiation with light emitted from a black fluorescent lamp (FL10BLB: tradename, a product of Toshiba, 10 W). The light intensity was 0.5–0.8 mW/cm$^2$. The functional water flowed down to the bottom of the reaction column 151 was discharged from the water discharge port 118 as wastewater. The hexane extract of the wastewater was subjected to gas chromatography with an ECD detector to determine the concentrations of the various halogenated aliphatic hydrocarbon compounds and aromatic compounds in the wastewater. As a result, concentrations of ethylene chloride, benzene, phenol, trichloroethylene and tetrachloroethylene were less than 0.03 ppm. The exhaust gas passed through the reaction column was discharged from the exhaust gas discharge port 121 at the bottom of the reaction column. The concentrations of the components of the exhaust gas after treatment are shown in Table 1 below.

TABLE 1

| | Before treatment | After treatment |
|---|---|---|
| Soot particles (g/Nm$^3$) | 15–25 | 0.1 or less |
| Ethylene chloride (ppm) | 0.3 | 0.006 or less |
| Benzene (ppm) | 0.8 | 0007 or less |
| Phenol (ppm) | 0.5 | 0.006 or less |
| Trichloroethylene (ppm) | 12 | 0.05 or less |
| Tetrachloroethylene (ppm) | 4 | 0.05 or less |

However, it was observed that in the functional water discharged from the discharge port 118 there were several slight peaks of dichloroacetic acid etc., presumably decomposition products of TCE etc.

The functional water used for the treatment was mixed in the tank 119 with the alkaline functional water generated at the cathode 103 compartment. The resulting solution had a pH of 7.1. It was sent to the aeration tank 168, where it was aerated at 200 ml/min, to a chlorine concentration of 0.5 ppm or less. The mixed solution was then sent to the microbial treatment tank 169, containing acclimatized soil and soil microorganisms collected in Morinoichi, Atsugi-shi, Kanagawa Prefecture, Japan. Microbial treatment was carried out with a retention time of 6 hours. As a result, all peaks of decomposition products disappeared.

What is claimed is:

1. An apparatus for decomposing a target substance, which is a halogenated aliphatic hydrocarbon compound or a halogenated aromatic compound, comprising:

a water tank for holding water containing chlorine and for contacting the target substance with the chlorine;

a means for feeding the target substance to the water;

a light source for irradiating the water containing the supplied target substance with light at a wavelength of 300 nm to 500 nm; and a means for reducing a chlorine concentration of a wastewater discharged from the water tank by contacting the wastewater with air.

2. The apparatus according to claim 1, further comprising a pH controlling means provided between the water tank and the means for reducing the chlorine concentration.

3. The apparatus according to claim 1, wherein the wavelength of light is 350 nm to 450 nm.

4. The apparatus according to claim 1, wherein the light source irradiates light at a light intensity of 10 $\mu$W/cm$^2$ to 5 mW/cm$^2$.

5. The apparatus according to claim 1, wherein the light source irradiates light at a light intensity of 50 $\mu$W/cm$^2$ to 5 mW/cm$^2$.

6. The apparatus according to claim 1, further comprising:
a diaphragm to separate the water tank into a first region and a second region communicating with each other;
an anode provided in the first region;
a cathode provided in the second region; and
a power source connected to the anode and the cathode.

7. The apparatus according to claim 6, further comprising a tank in which the wastewater discharged from the first and second regions is mixed.

8. The apparatus according to claim 1, wherein the water tank holds a hypochlorite solution.

9. The apparatus according to claim 8, wherein the hypochlorite is sodium hypochlorite and/or potassium hypochlorite.

* * * * *